(No Model.)
W. J. BROWNE.
SPRING CULTIVATOR BEAM LIFTER.
No. 340,551. Patented Apr. 27, 1886.
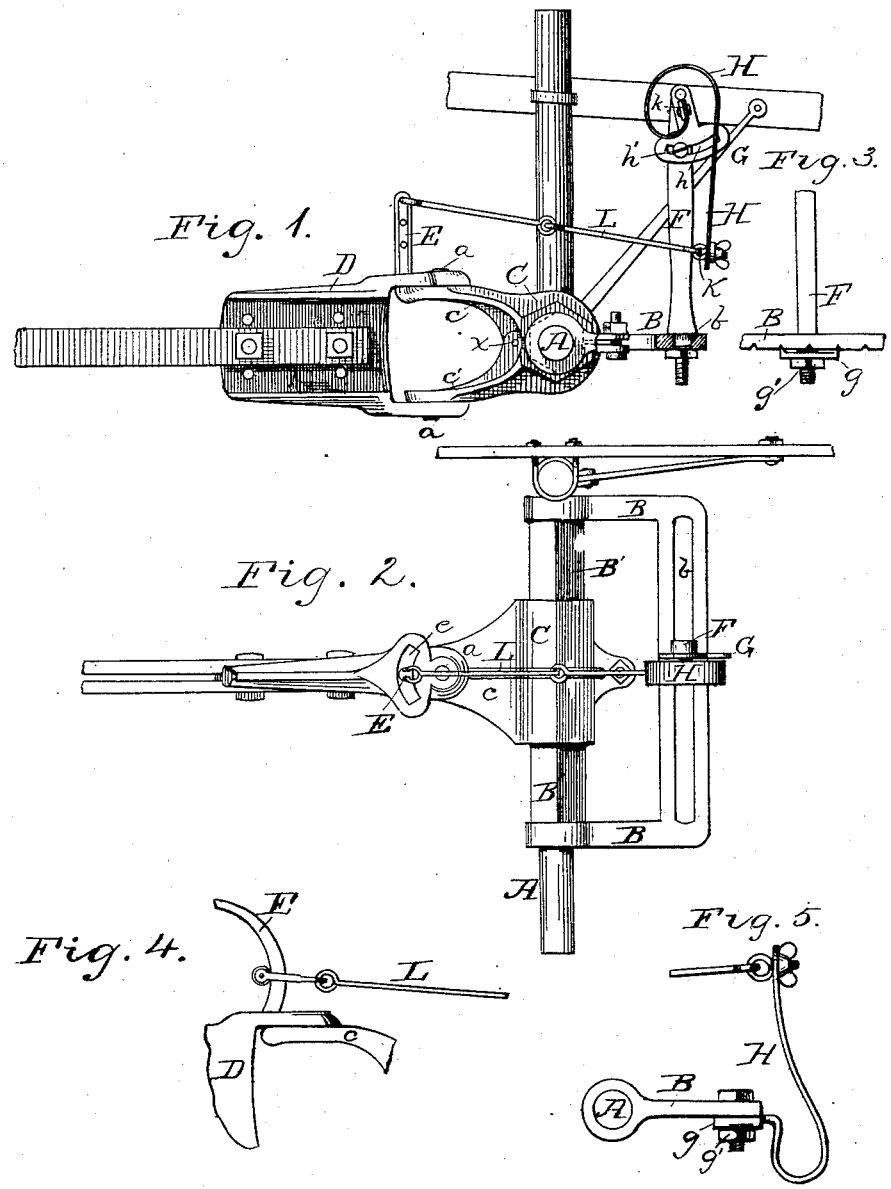

UNITED STATES PATENT OFFICE.

WILLIAM J. BROWNE, OF FORT MADISON, IOWA.

SPRING CULTIVATOR-BEAM LIFTER.

SPECIFICATION forming part of Letters Patent No. 340,551, dated April 27, 1886.

Application filed May 5, 1885. Serial No. 164,432. (No model.)

*To all whom it may concern:*

Be it known that I, WILLIAM JEROME BROWNE, of Fort Madison, in the county of Lee and State of Iowa, have invented certain new and useful Improvements in Spring Cultivator-Beam Lifters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a new and improved spring cultivator-beam lifter which permits a vertical or lateral motion of the beam without its efficacy being affected, and the tension of the spring of which can be increased or decreased at will without inconvenience.

In the drawings, Figure 1 is a side elevation of my improved spring beam-lifter. Fig. 2 is a plan view of the same. Fig. 3 is a detail view, and Figs. 4 and 5 are details views showing modifications of certain parts of my invention.

In the drawings, A represents an axle, and B represents the ⊔-frame, the connecting portion of which runs parallel with said axle and has a longitudinal vertical slot, $b$, in it. This frame has its ends provided with knuckles, by means of which it is journaled on said axle contiguous to the arch thereof.

Loose on the axle between the ends of frame B is a sleeve, B′, the exterior of which is polygonal shape, and has clamped around it, preferably midway between the ends of frame B, the coupling C. The coupling consists of two parts, which are hinged together at $x$, as shown, and are provided with jaws the engaging-surface of which corresponds to the shape of that portion of the sleeve, and have lugs projecting from their free ends, which, by means of a suitable bolt passing vertically through them having a nut on its screw-threaded end, can be made to pinch said axle sufficiently tight to hold the coupling in position. Extending from these jaws to the rear of their pivotal point are the arms $c$ $c'$, having pivotal studs $a$ $a$ projecting vertically from near their ends, on which the projecting arms or lugs of the clevis D are pivoted, as shown.

Extending vertically from arm $c$ of the upper jaw of the coupling is an arm, E, which has a series of holes in it, the purpose of which will hereinafter be explained.

In order to permit arm E to project vertically, I make a segmental slot, $e$, in the upper articulating arm of the clevis, which is struck from the pivotal point thereof. This slot is sufficiently wide and long to permit of any desired oscillation of the shovel-beams.

F represents a vertical post, having that portion of its shank which passes through slot $b$ square, and having a locking-washer, $g$, and a nut, $g'$, on its threaded end, by which it is kept in any desired position within the limits of said slot $b$. Pivoted to the side of the post, near its upper extremity, is an inverted-T frame or quadrant, G. This frame has a segmental slot, $h$, in its horizontal arm, struck from its pivotal center, by means of which and a set-screw, $h'$, passing through it into said post F, it may be oscillated and maintained at any desired angle to the perpendicular. Projecting laterally from the vertical arm of this T-frame is a lug, $k$, to which the inner end of this evolute spring H is permanently secured. The spring H, as shown in the drawings, describes an evolute, and its outer end sweeps vertically downward a suitable distance, and has passing through it the shank of an eye, K, which is held in position by a thumb-nut on the said screw-threaded shank. This spring H is connected, through the medium of a connecting rod or links, L, to the arm E. Thus, when the shovel-beams of the cultivator are lifted, the spring will lessen materially the weight the plow-man has to raise; or, if the shovels are swung laterally to the draft, the segmental slot in the upper lug of the clevis permits the arm E to operate undisturbed in conjunction with spring H. The locking-washer $g$, which has been referred to, is provided with transverse pointed protuberances at about its four corners, which are so registered as to enter transverse notches made in the under surface of the slotted part of frame B, when the nut $g'$ is manipulated to bring it into close contact with said frame. Thus the post F may be located at any suitable point within the limits of the slot of frame B.

One of the very important advantages of my invention is, that by placing the arm E to the rear of the pivotal connection of the clevis and coupling (and thus obtaining a greater leverage from the center of the axle for the spring to act on) the weight for the spring is proportionately decreased. This has not before been attained, simply because the segmental slot in the upper articulating lug of the clevis was not thought of. It will be observed, though, that the lugs of the clevis might be made nearer together, and be placed between the arms $c$ $c'$ of the coupling, and pivotally connected thereto by means of a pintle or king-bolt, and in this construction the arm E might be made without the segmental slot in the upper lug of the clevis.

It will be observed that so far as the principle is concerned of putting the arm E back of the pivotal studs of the coupling, it makes no difference what kind of spring is used in connection with it. As, therefore, any kind of spring performing the same function as those shown can be used, I do not wish to be confined to spring H or modifications thereof.

If desired, spring H may be dispensed with and the V-shaped spring shown in Fig. 4 be used instead. If this spring is used, its lower end is fastened between the washer $g$ and frame B by a bolt and nut, as shown. The upper end of this V-spring is connected in the same manner as spring H to the arm E.

Any suitable way may be adopted to connect spring H and arm E.

The arm E may be sickle-shaped, having its concave or inversely-curved surface facing the rear, and having a traveler journaled between the ends of a ⊔ iron or frame rolling thereon and connected in a suitable manner to spring H. As the shovel-beams are lifted, the traveler moves toward the end of the arm, and thus the spring preserves its tension throughout any reasonable oscillation of said beams.

What I claim as new, and desire to secure by Letters Patent, is—

1. In a cultivator, the combination, with the axle, coupling C, and clevis, and an arm, E, projecting vertically from said coupling at a point in the rear of the pivotal connection of said coupling and clevis, of a spring attached to said arm E and adapted to counterpoise the weight of the shovel-beam secured to said clevis.

2. In a cultivator, the combination, with the axle A and coupling C, having a vertical arm, E, extending from it in the rear of the pivotal point of the clevis, and said clevis having a segmental slot in its upper articulating lug through which said arm E passes, of a suitable spring attached to said arm and adapted to counterpoise the weight of the shovel-beams secured to said clevis.

3. In a cultivator, the combination, with the axle A, frame B, coupling C, having a vertical arm, E, of a vertical post, F, spring H, and means for connecting said arm E and spring H.

4. The combination, in a cultivator, with the axle A, frame B, having a longitudinal slot therein parallel to said axle, and coupling C, adjustable laterally on said axle between the ends of frame B, and having a vertical arm, E, of a spring secured to frame B, and adjustable within the limits of the slot thereof, and means for connecting said spring and arm E.

5. The combination, in a cultivator, with axle A, frame B, and coupling C, having arm E, of the vertical post F, T-frame G, pivoted near the upper end thereof, and means, as described, for maintaining said frame G at any desired angle, spring H, and a rod or links for connecting said spring H and arm E.

6. The combination in a cultivator, with axle A and ⊔-frame B, having a longitudinal slot therein in the part parallel to said axle, and having transverse notches in its under surface, of the spring H, bolt or post, locking-washer $g$, and nut.

In testimony that I claim the foregoing as my own I hereunto affix my signature in presence of two witnesses.

WILLIAM J. BROWNE.

Witnesses:
JAMES H. COYNE,
FRANK D. THOMASON.